2,890,213

PROCESS FOR THE PRODUCTION OF POLYETHYLENE CHLORINATION PRODUCTS

Heinz Noeske, Oberhausen-Sterkrade, Germany, assignor to Ruhrchemie Aktiengesellschaft, Oberhausen-Holten, Germany No Drawing. Application July 14, 1955
Serial No. 522,180

Claims priority, application Germany, July 16, 1954

4 Claims. (Cl. 260—94.9)

Polyethylenes as may be produced by means of suitable polymerization stimulants at pressure ranging below 200 kg./sq. cm. and at temperatures of up to about 100° C. are not capable of being chlorinated by the conventional chlorination methods. Moreover, they are practically insoluble in all solvents.

It has been found that polyethylene having molecular weights of above 25,000 and especially more than 100,000 can be chlorinated with a surprisingly good success by allowing gaseous chlorine, and preferably preheated chlorine gas, to act upon solid polyethylene which is as finely divided as possible. It could not be foreseen that addition of chlorine to solid, pulverulent or granular polyethylene takes place to a sufficient extent and with a sufficiently high reaction velocity. It is of particular advantage that the external structure of the polyethylene undergoes no change in the chlorination. When starting, for example, with white pulverulent polyethylene there is obtained a chlorinated product which remains white and pulverulent. The temperature in the chlorination should not be substantially in excess of 100° C. The most favorable range of temperature is 70–90° C. It may be of advantage to effect the treatment with chlorine with irradiation.

Polyethylenes of this kind which are practically insoluble in solvents can be produced, for example, by polymerization of ethylene with polymerization stimulants which preferably contain organometallic compounds. Examples of polymerization stimulants of this kind are mixtures of titanium tetrachloride and aluminum alkyl compounds such as diethyl aluminum chloride, aluminum triethyl or diisobutyl aluminum monochloride. Other metal salts such as zirconium acetyl-acetonate or thorium acetyl-acetonate may be used instead of titanium tetrachloride. The polymerization is effected by means of these polymerization stimulants at relatively low pressures generally not exceeding 100 kg./sq. cm. and at temperatures of 20° to about 100° C. The molecular weights of the polyethylenes thus produced may be varied within relatively wide limits, viz. from about 25,000 to more than 100,000 depending upon the combinations of polymerization stimulants used. When suitably selecting the reaction conditions, there are obtained fine-grained white polymers with particle sizes being practically below 0.25 mm. and most of the time even below 0.08 mm.

The polyethylene produced in this manner, as contrasted with the commercial polyethylenes having molecular weights of about the same order of magnitude, prove to be practically insoluble in organic solvents. The chlorination of the polyethylenes marketed up to the present was practically effected in solution, with a dissolution in carbon tetrachloride being effected prior to the chlorination. This chlorination process cannot be applied with the polyethylenes in accordance with the invention.

For commercial purposes, the chlorination may be effected in various manners. It is possible, for example, to agitate the granular or pulverulent polyethylene in shelved furnaces by means of stirring devices, while exposing it to the action of a current of chlorine which has preferably been preheated. Examples of other devices which are suitable for carrying out the process of the invention are rotary drums, kneading machines, conveyor screws, or stirrers which are arranged in horizontal tubes or vertical vessels. It is also possible to use similar devices to those used in catalytic hydrocarbon cracking processes with moved catalyst masses.

It is of particular advantage to effect the chlorination by the fluidized process. This process is operated with very finely divided polyethylene such as with polyethylene having a particle size below 0.3 mm. which is easily obtained when suitably conducting the reaction of the ethylene polymerization. With such a fine distribution of the polyethylene, a uniform chlorination of all the polyethylene particles is easily attainable. The removal of the heat of the reaction, which may be effected by means of circulating chlorine gas, which may be diluted with inert gases, or by means of cooled wall surfaces causes no difficulties in this case. The incoming chlorine is preferably preheated to 40–90° C. It is also possible, however, to preheat the mass itself to the desired temperatures to obtain a smooth course of the reaction. The degree of chlorination and the removal of the heat of reaction can easily be controlled by recycling a part of the solid reaction products.

The invention will now be more fully described in a number of examples, but it should be understood that these are given by way of illustration and not of limitation and that many changes can be made in the details without departing from the spirit of the invention.

*Example 1*

Twenty grams of polyethylene having a molecular weight of about 580,000 and a particle size below 0.25 mm. were filled into a glass tube of 45 mm. in diameter and 50 cm. in length which was closed at the bottom with a glass frit and provided with an external jacket through which water of 85° C. was flowing. The outside surface of the tube was irradiated by a 500 watt bulb. Chlorine which had previously been preheated to 90° C. was introduced through the porous glass plate from below at a rate of 80 normal liters/hr. While the operation was proceeding, a fluidized bed was formed by the solid reactants. After a reaction period of four hours the treatment with chlorine was discontinued. The solid reaction product was freed from adsorbed chlorine and hydrogen chloride by evacuation at 80° C. A white pulverulent product having a chlorine content of 44 wt. percent Cl was obtained.

*Example 2*

Fifty grams of polyethylene having a molecular weight of 45,000 and a particle size below about 0.25 mm. were filled into a glass tube of 45 mm. in diameter and 50 cm. in length, closed at the bottom with a glass frit and provided with an external jacket through which water of 85° C. was flowing. The polyethylene had been produced by polymerization of ethylene at normal atmospheric pressure and at a temperature of 60–80° C. with the use of a catalyst consisting of titanium tetrachloride and diethyl-aluminum monochloride, and in the presence of a saturated hydrocarbon $C_7$–$C_{10}$ freed from oxygen-containing compounds, from which the catalyst, after the termination of the polymerization, was separated by filtration and subsequent treatment with steam. The tube was irradiated by a 500 watt bulb. Chlorine which had been preheated to 90° C. was introduced from below through the glass frit at a rate of 80 liters/hr. While the reaction proceeded, a fluidized bed of the polyethylene mass developed. After a reaction period of about 4 hours, the treatment with chlorine was discontinued. The solid reaction product was freed from adsorbed gases by evacuation at 80° C. A white pulverulent product having a chlorine content of 48 wt. percent was obtained.

What I claim is:

1. A process for the production of polyethylene chlorination products which comprises reacting dry solid polyethylene, obtained by polymerization of ethylene at pressures up to 100 kg./cm.$^2$ and at temperatures ranging from 20 to 100° C. in the presence of catalysts consisting of aluminum alkyl compounds and titanium tetrachloride, said polyethylene having a molecular weight above 25,000 and a particle size below 0.3 mm., with gaseous chlorine, which had been preheated to 40–90° C., at temperatures not substantially exceeding 100° C., and under irradiation and while holding said polyethylene in a fluidized bed state by means of the gas used for the chlorination.

2. A process according to claim 1, wherein the molecular weight of the polyethylene is above 100,000.

3. A process according to claim 1, in which the action of chlorine is effected at 70–90° C.

4. A process according to claim 1, in which the chlorine used for the treatment of said polyethylene is diluted with inert gases.

References Cited in the file of this patent

UNITED STATES PATENTS

| | | |
|---|---|---|
| 2,276,951 | Fisher | Mar. 17, 1942 |
| 2,398,803 | Myles | Apr. 23, 1946 |
| 2,592,763 | Taylor | Apr. 15, 1952 |
| 2,721,189 | Anderson et al. | Oct. 18, 1955 |

FOREIGN PATENTS

| | | |
|---|---|---|
| 510,145 | Canada | Feb. 15, 1955 |